(12) United States Patent
Qiu

(10) Patent No.: US 11,132,043 B2
(45) Date of Patent: Sep. 28, 2021

(54) POWER FAILURE DETECTING SYSTEM AND METHOD FOR DUAL CENTRAL PROCESSING UNIT

(71) Applicant: Shenzhen Fugui Precision Ind. Co., Ltd., Shenzhen (CN)

(72) Inventor: Duo Qiu, Shenzhen (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 46 days.

(21) Appl. No.: 16/361,497

(22) Filed: Mar. 22, 2019

(65) Prior Publication Data

US 2020/0257347 A1 Aug. 13, 2020

(30) Foreign Application Priority Data

Feb. 13, 2019 (CN) .................. 201910113347.X

(51) Int. Cl.
*G06F 11/07* (2006.01)
*G06F 1/30* (2006.01)
*G06F 1/28* (2006.01)

(52) U.S. Cl.
CPC . *G06F 1/30* (2013.01); *G06F 1/28* (2013.01)

(58) Field of Classification Search
CPC ... G06F 1/29; G06F 1/30; G06F 11/07; G06F 11/0721; G06F 11/0724
See application file for complete search history.

(56) References Cited

U.S. PATENT DOCUMENTS

| 7,132,822 | B1* | 11/2006 | Breitlow | ............... G06F 1/30 324/142 |
| 9,778,988 | B2 | 10/2017 | Huang et al. | |
| 2017/0010938 | A1* | 1/2017 | Huang | ............... G06F 1/30 |

FOREIGN PATENT DOCUMENTS

CN 104991629 A 10/2015

* cited by examiner

*Primary Examiner* — Matthew M Kim
*Assistant Examiner* — Kyle Emanuele
(74) *Attorney, Agent, or Firm* — ScienBiziP, P.C.

(57) ABSTRACT

A system for detecting power failure in a dual processing system includes a first central processing unit (CPU), a second CPU, a power controlling unit, and a complex programmable logic device (CPLD). The power controlling unit is electrically coupled to the first CPU and the second CPU and the CPLD. The CPLD can determine a power failure occurring in relation to the first CPU and the second CPU. If power to the first CPU does not fail but power to the second CPU does fail, the CPLD controls the power controlling unit to stop supplying power for the second CPU only and make a certain number of power restart attempts. A method for detecting a power failure is also provided.

7 Claims, 4 Drawing Sheets

POWER FAILURE DETECTING SYSTEM AND METHOD FOR DUAL CENTRAL PROCESSING UNIT

FIELD

The subject matter herein generally relates to detecting power failures.

BACKGROUND

When there is a problem with the power supply of a central processing unit (CPU), checking whether the power module is faulty can be complicated. The power module is checked by sequentially measuring the power good signal of the boot timing through an oscilloscope or a three-meter power meter. Such a method of checking the power module of the CPU may be difficult to complete within a short period of time.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
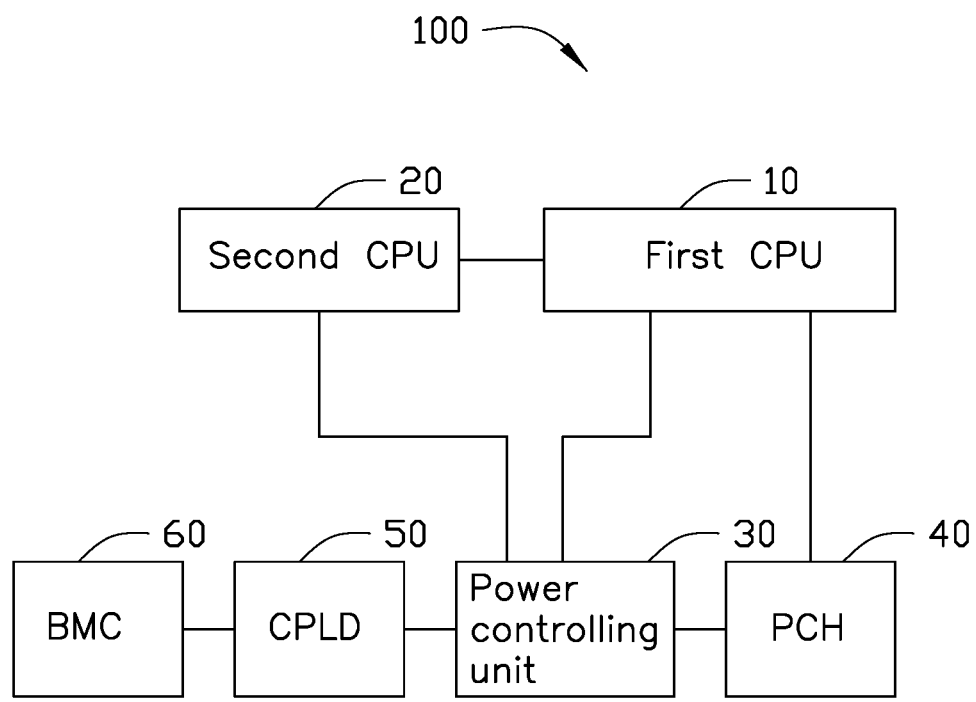
FIG. 1 is a schematic diagram of an embodiment of a power failure detecting system for a dual central processing unit.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a system for detecting power failure for dual central processing unit (CPU) 100 in accordance with an embodiment of the present disclosure.

The power failure detecting system 100 includes a first CPU 10, a second CPU 20, a power controlling unit 30, a platform controller hub (PCH) 40, a complex programmable logic device (CPLD) 50, and a baseboard management controller (BMC) 60.

The first CPU 10 communicates with the second CPU 20 for speedier performance.

The power controlling unit 30 is electrically coupled between the PCH 40 and CPLD 50, the power controlling unit 30 provides auxiliary power to the PCH 40 and the CPLD 50.

The power controlling unit 30 is electrically coupled to the first CPU 10 and the second CPU 20, the power controlling unit 30 provides main power to the first CPU 10 and second CPU 20.

The PCH 40 is electrically coupled to the first CPU 10, the PCH 40 controls data exchange between the external device (not shown in figures) and the first CPU 10 and the second CPU 20.

The CPLD 50 is electrically coupled between the BMC 60 and the power controlling unit 30, the CPLD 50 outputs signal to the power controlling unit 30 which starts or stops power to the first CPU 10 and the second CPU 20. The CPLD 50 obtains power-on information of the first CPU 10 and the second CPU 20 from the power controlling unit 30.

The CPLD 50 determines whether there is a failure of power to the first CPU 10 and the second CPU 20 according to the power-on information, and records the power failure information of the first CPU 10 and the second CPU 20 in the BMC 60.

The CPLD 50 controls the power controlling unit 30 to stop supplying power to the first CPU 10 and the second CPU 20 if a power failure occurs in relation to the first CPU 10.

The CPLD 50 controls the power controlling unit 30 to stop powering the second CPU 20 but continues to supply power to the first CPU 10 if the second CPU 20 has a power failure but first CPU 10 is still receiving power.

Figure 2:
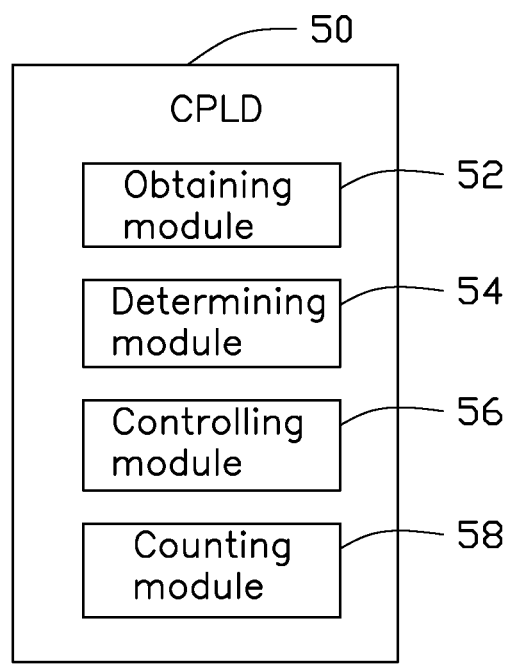
FIG. 2 is a schematic diagram of an embodiment of a complex programmable logic device (CPLD) in the system of FIG. 1.

FIG. 2 illustrates that the CPLD 50 includes an obtaining module 52, a determining module 54, a controlling module 56, and a counting module 58.

The controlling module 56 outputs an enable signal to the power controlling unit 30 to control the power controlling unit 30 power the first CPU 10 and the second CPU 20.

The obtaining module 52 obtains a power-on information of the first CPU 10 (first power-on information) and a power-on information of the second CPU 20 (second power-on information) from the power controlling unit 30, and transmits the first power-on information and the second power-on information to the determining module 54.

The determining module 54 determines whether power to the first CPU 10 has failed according to the first power-on information.

The controlling module 56 controls the power controlling unit 30 to stop powering the first CPU 10 and the second CPU 20 if the first CPU 10 has a power failure.

The determining module 54 determines whether power to the second CPU 20 has failed according to the second power-on information even if the first CPU 10 does not have a power failure.

The controlling module 56 controls the power controlling unit 30 to power both the first CPU 10 and the second CPU 20 if the second CPU 20 is still receiving power.

The controlling module 56 controls the power controlling unit 30 to perform power restart on the first CPU 10 and second CPU 20 if the second CPU 20 has a power failure. If the second CPU 20 does not have power failure after the power is restarted, the indicated power failure of the second CPU 20 is taken as a false indication. If the second CPU 20 still has a power failure, the restart of the power supply is repeated.

The counting module 58 counts the number of times that the power is restarted, and obtains a count value. The count value is compared to a preset value.

The controlling module 56 controls the power controlling unit 30 to repeat the restarting of power to the first CPU 10 and the second CPU 20 if the count value is determined to be less than the preset value.

The controlling module 56 controls the power controlling unit 30 to stop repeating the restart of power to the second CPU 20 if the count value is determined to be equal to the preset value. Power to the first CPU 10 is continued even if the count value is equal to the preset value. Therefore, the power failure detecting system 100 will enter an operational readiness state.

When the power failure detecting system 100 is in an operational readiness state, the obtaining module 52 is further configured to acquire power supply information of the first CPU 10 and of the second CPU 20.

The determining module 54 determines whether power to the first CPU 10 and to the second CPU 20 has failed according to the power supply information. The controlling module 56 controls the power controlling unit 30 to power the first CPU 10 and the second CPU 20 as long as power supply to the first CPU 10 and the second CPU 20 does not fail. The controlling module 56 controls the power controlling unit 30 to stop supplying power to the first CPU 10 and the second CPU 20 if power to the first CPU 10 and the second CPU 20 fails.

Figure 3:
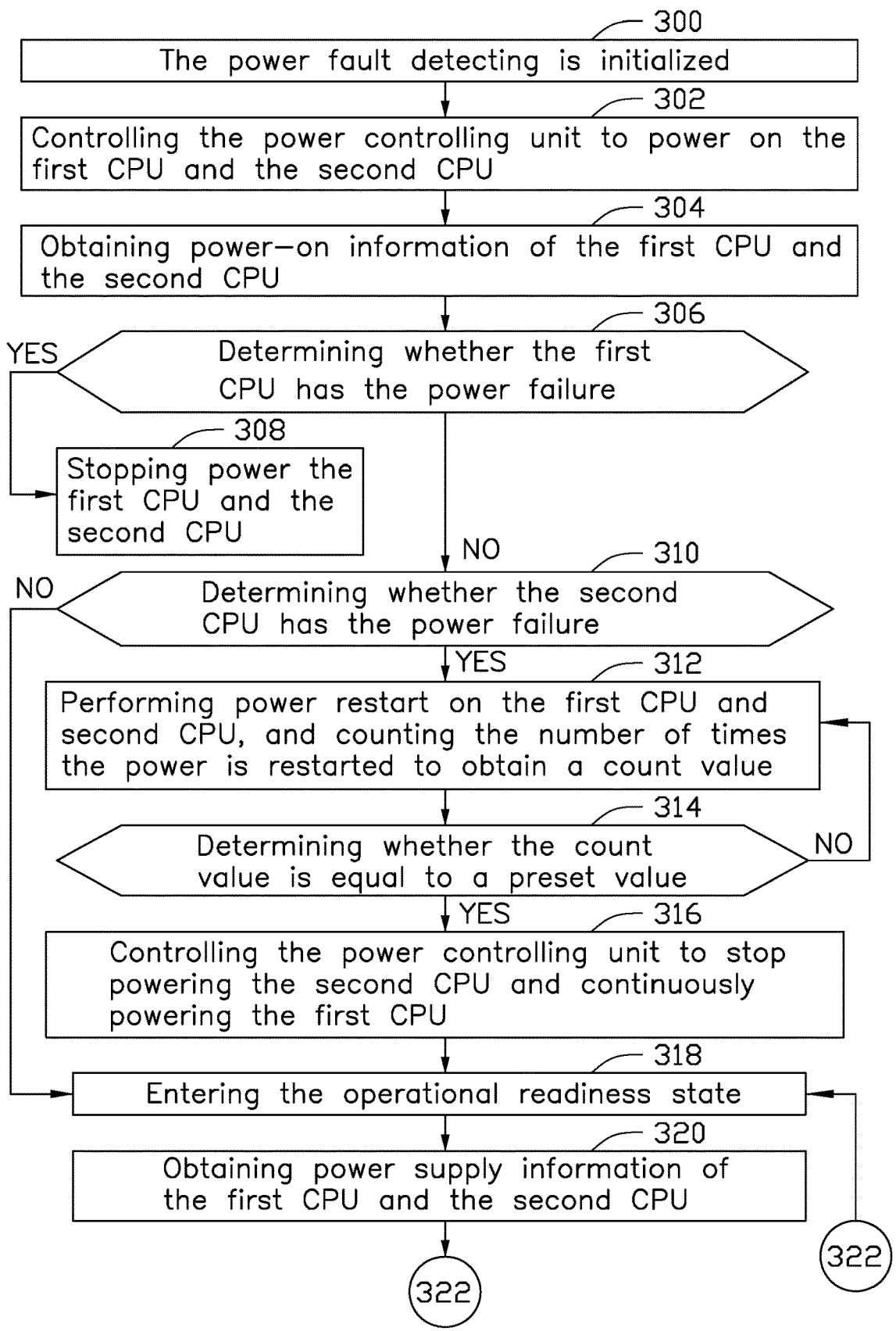
FIGS. 3 and 4 show flow diagrams of an embodiment of a method for detecting power failure in relation to dual central processing unit.
Figure 4:
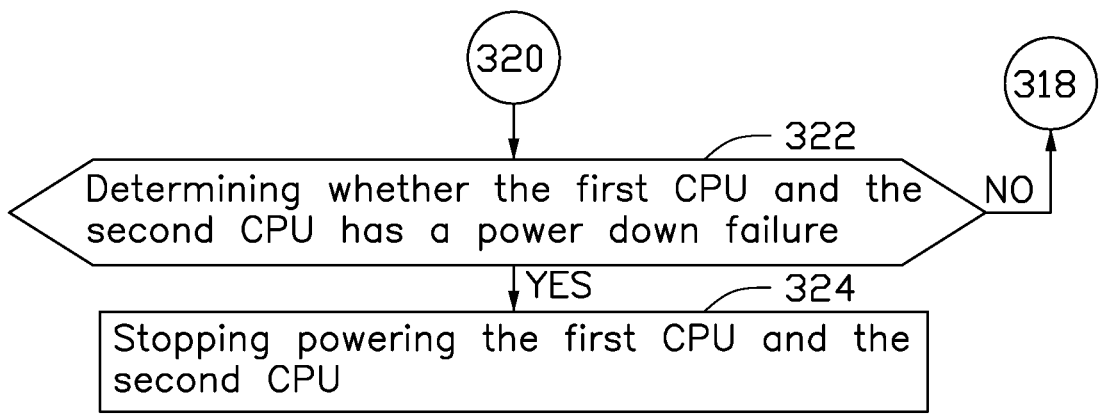

FIG. 3 is a flowchart depicting an embodiment of a power failure detecting method. The method is provided by way of example, as there are a variety of ways to carry out the method. The method described below can be carried out using the configurations illustrated in FIGS. 1-2 for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 300.

At block 300, the power failure detecting 100 is initialized.

The power controlling unit 30, the PCH 40, the CPLD 50, and the BMC 60 all work normally.

At block 302, the controlling module 56 outputs the enable signal to the power controlling unit 30, to control the power controlling unit 30 to power to the first CPU 10 and the second CPU 20.

At block 304, the obtaining module 52 obtains the first power-on information of the first CPU 10 and the second power-on information of the second CPU 20 from the power controlling unit 30, and transmits the first power-on information and the second power-on information to the determining module 54.

At block 306, the determining module 54 determines whether power to the first CPU 10 has failed according to the first power-on information. If the power to the first CPU 10 has failed, block 308 is implemented, otherwise block 310 is implemented.

At block 308, the controlling module 56 controls the power controlling unit 30 to stop supplying power to the first CPU 10 and the second CPU 20.

At block 310, the determining module 54 determines whether power to the second CPU 20 has failed according to the second power-on information. If power to the second CPU 20 has failed, block 312 is implemented, otherwise block 318 is implemented.

At block 312, the controlling module 56 controls the power controlling unit 30 to perform power restart on the first CPU 10 and second CPU 20, and the counting module 58 counts the number of times the power is restarted to obtain a count value.

In at least one embodiment, the controlling module 56 outputs an enable signal to the power controlling unit 30 to cause the first CPU 10 and the second CPU 20 to be powered back on.

At block 314, the counting module 58 determines whether the count value is equal to a preset value. If the count value is equal to a preset value, block 316 is implemented, otherwise returns to block 312.

At block 316, the controlling module 56 controls the power controlling unit 30 to stop supplying power to the second CPU 20 and power to the first CPU 10.

At block 318, the power failure detecting system 100 enters the operational readiness state.

At block 320, the obtaining module 52 acquires power supply information of the first CPU 10 and the second CPU 20.

At block 322, the determining module 54 determines whether the first CPU 10 and the second CPU 20 has a power down failure according to the power supply information. If the first CPU 10 and the second CPU 20 has the power down failure, block 324 is implemented, otherwise returns to block 318.

At block 324, the controlling module 56 controls the power controlling unit 30 to stop supplying power to the first CPU 10 and the second CPU 20.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A power failure detecting method for dual central processing unit (CPU), comprising:
   providing power to a first CPU and a second CPU;
   determining whether power to the first CPU and the second CPU has failed;
   stopping supplying power to the first CPU and the second CPU when the first CPU has a power failure; and
   stopping supplying power to the second CPU and providing power for the first CPU when the second CPU has the power failure and the first CPU does not have the power failure;
   controlling the first CPU and the second CPU to perform a power restart and counting the number of power restarts to obtain a count value when the first CPU does not have a power failure and the second CPU has a power failure.

2. The power failure detecting method of claim 1, further comprising:
   obtaining a first power-on information of the first CPU and a second power-on information of the second CPU; and
   determining whether power to the first CPU has failed according to the first power-on information.

3. The power failure detecting method of claim 2, further comprising:
   determining whether power to the second CPU has failed; according to the second power-on information when the first CPU does not have a power failure.

4. The power failure detecting method of claim 3, further comprising:
   determining whether the count value is equal to a preset value; and
   stopping power for the second CPU and providing power for the first CPU when the count value is equal to the preset value.

5. The power failure detecting method of claim 4, further comprising:
   controlling the first CPU and the second CPU to perform a or another power restart when the count value is less than the preset value.

6. The power failure detecting method of claim 1, further comprising:
   obtaining power supply information from the first CPU and the second CPU;
   determining whether the first CPU and the second CPU have a power down failure according to the power supply information of the first CPU; and
   providing power for the first CPU and the second CPU when the first CPU and the second CPU do not have a power down failure.

7. The power failure detecting method of claim 6, further comprising:
   stopping power for the first CPU and the second CPU when the first CPU and the second CPU have the power down failure.

* * * * *